United States Patent
Nagahara

[11] Patent Number: 6,075,658
[45] Date of Patent: Jun. 13, 2000

[54] IMAGING LENS

[75] Inventor: Akiko Nagahara, Koshigaya, Japan

[73] Assignee: Fuji Photo Optical Co., Ltd., Omiya, Japan

[21] Appl. No.: 09/252,803

[22] Filed: Feb. 19, 1999

[30] Foreign Application Priority Data

Feb. 27, 1998 [JP] Japan ................... 10-064421

[51] Int. Cl.$^7$ .............. G02B 13/04; G02B 9/60
[52] U.S. Cl. .................. 359/753; 359/770; 359/761; 359/740
[58] Field of Search ................... 359/794, 770, 359/740, 753, 684, 691, 761

[56] References Cited

U.S. PATENT DOCUMENTS

| 222,132 | 12/1879 | Gundlach | 359/794 |
|---|---|---|---|
| 1,882,530 | 10/1932 | Tronnier | 359/794 |
| 2,407,219 | 9/1946 | Bennett | 359/794 |
| 3,490,825 | 1/1970 | Takahashi | 359/770 |
| 3,731,989 | 5/1973 | Shimizu | 359/753 |
| 3,799,655 | 3/1974 | Laikin | 359/753 |
| 5,539,581 | 7/1996 | Sato | 359/691 |
| 5,589,988 | 12/1996 | Suenaga | 359/761 |
| 5,696,633 | 12/1997 | Nakajima | 359/691 |
| 5,963,381 | 10/1999 | Ori | 359/761 |

FOREIGN PATENT DOCUMENTS

H9-197266  7/1997  Japan.

Primary Examiner—Georgia Epps
Assistant Examiner—Evelyn A. Lester
Attorney, Agent, or Firm—Arnold International; Bruce Y. Arnold

[57] ABSTRACT

An imaging lens is disclosed having two lens groups, both of positive refractive power, a diaphragm positioned between the lens groups, and five or fewer lens elements with no aspherical surfaces. The imaging lens provides a high resolution over a wide image angle. During focusing, only the position of the rear lens group is adjusted relative to the image surface, enabling a low-cost shutter mechanism to be employed as the diaphragm. The front lens group includes, in order from the object side, either a plano-concave or a biconcave lens element and, in addition, a biconvex lens element. The rear lens group includes, in order from the object side, a positive meniscus lens element with its convex surface on the image side, a negative meniscus lens element with its concave surface on the image side, and a biconvex lens element. By having the ratio of the focal length of the positive meniscus lens element of the rear lens group divided by the focal length of the imaging lens be greater than 1.4 and less than 4.2, distortion is minimized.

8 Claims, 12 Drawing Sheets

IMAGING LENS

BACKGROUND OF THE INVENTION

Lately, there are many video cameras and stiff video cameras that have a solid-state image sensor at the image plane. In such a camera having a solid-state image sensor, an imaging lens is required that has different characteristics from those imaging lenses used with cameras employing silver chloride film.

On the other hand, as an imaging lens for a camera loaded with a solid-state image sensor, a compact lens having two lens groups is known that focuses by shifting only a rear lens group, as disclosed in Japanese Laid-Open Patent Application H09-197266. The overall length of the imaging lens remains constant during focusing. Also, the lens is a retro-focus type lens, being capable of providing a wide-angle view. Moreover, since it has a structure whereby a shutter mechanism does not move axially relative to an image formation surface, there is the advantage in that the shutter mechanism can be simplified. However, the lens of the above-noted laid-open patent application has either a six lens element or five lens element structure. With six lens elements, the overall lens length is too long. With five lens elements, an aspherical surface is used, thereby increasing the cost. Thus, such a lens has not satisfied the demand for a compact lens having a low cost of production. Moreover, the lens of the above-mentioned laid-open patent application has a large distortion and thus is not suitable for use in recording images of letters or other text documents and the like. Thus, there remains an unsatisfied demand for a low cost, wide-angle lens having minimum distortion.

BRIEF SUMMARY OF THE INVENTION

The present invention relates to an imaging lens, and more particularly relates to an imaging lens that is suitable as a photographic lens for video cameras as used in video telephones, door phones and lookouts, still video cameras, digital still cameras, and the like. A first object of the invention is to provide an imaging lens of five or fewer lens elements and no aspherical surface. A second object of the invention is, in an imaging lens for cameras having a positive front lens group, a diaphragm, a positive rear lens group, and a solid-state image sensor, to accomplish focusing by shifting only the rear lens group, thus enabling a low cost shutter mechanism whose axial position is fixed to be used as the diaphragm. As cameras have recently been used more frequently for recording images of text and the like than previously, it has become important to provide a wide-angle lens which limits distortion to a minimum. Thus, a third object of the invention is to provide a wide-angle imaging lens having a high resolution and a minimum amount of distortion, thus enabling the imaging lens to be used with a solid-state image sensor having a large number of pixels for recording text and other documents where distortion becomes readily apparent to a user.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The imaging lens of the present invention includes, in order from the object side: a front lens group of positive refractive power having either a plano-concave lens or a biconcave lens, and, in addition, a biconvex lens; a diaphragm; and, a rear lens group having positive refractive power; wherein focusing is carried out by shifting only the rear lens group relative to an image formation surface.

It is preferred that the rear lens group includes, in order from the object side: a positive meniscus lens element with its convex surface on the image side, a negative meniscus lens element having its concave surface on the image side, and a biconvex lens element. Moreover, in order to more favorably correct distortion, it is also preferred that the positive meniscus lens element of the rear lens group satisfies the following Condition (1):

$$1.4 < f_3/f < 4.2 \qquad \text{Condition (1)}$$

where $f_3$ is the focal length of the positive meniscus lens element of the rear lens group, and f is the focal length of the imaging lens.

In accordance with the imaging lens of the present invention, it is possible to provide a wide image angle by making the surface on the object side of the first lens element of the front group to be a planar surface or a concave surface. If the surface on the object side is convex, the refracting burden on the surface on the image side of the second lens element of the front lens group becomes too large for balancing the overall aberrations while maintaining a wide image angle, thereby making the radius of this surface so small that manufacturing of the lens element becomes difficult (and thus, expensive). In addition, it is not necessarily a good idea to make the surface on the object side of the first lens element a concave surface in order to correct for distortion. This is because negative distortion increases as the curvature of the concave surface becomes large. In accordance with the imaging lens of the present invention, positive distortion is generated as a preferable characteristic at the rear lens group (i.e., the lens group on the image side of the diaphragm) so as to compensate for negative distortion generated at the first lens element of the front lens group. In other words, the rear lens group has a structure of three lens elements—a positive meniscus lens element with its convex surface on the image side, a negative meniscus lens element with its concave surface on the image side and a biconvex lens element. By satisfying Condition (1) above, distortion is minimized to a value lower than in the prior art lenses known to applicant.

Figure 1:
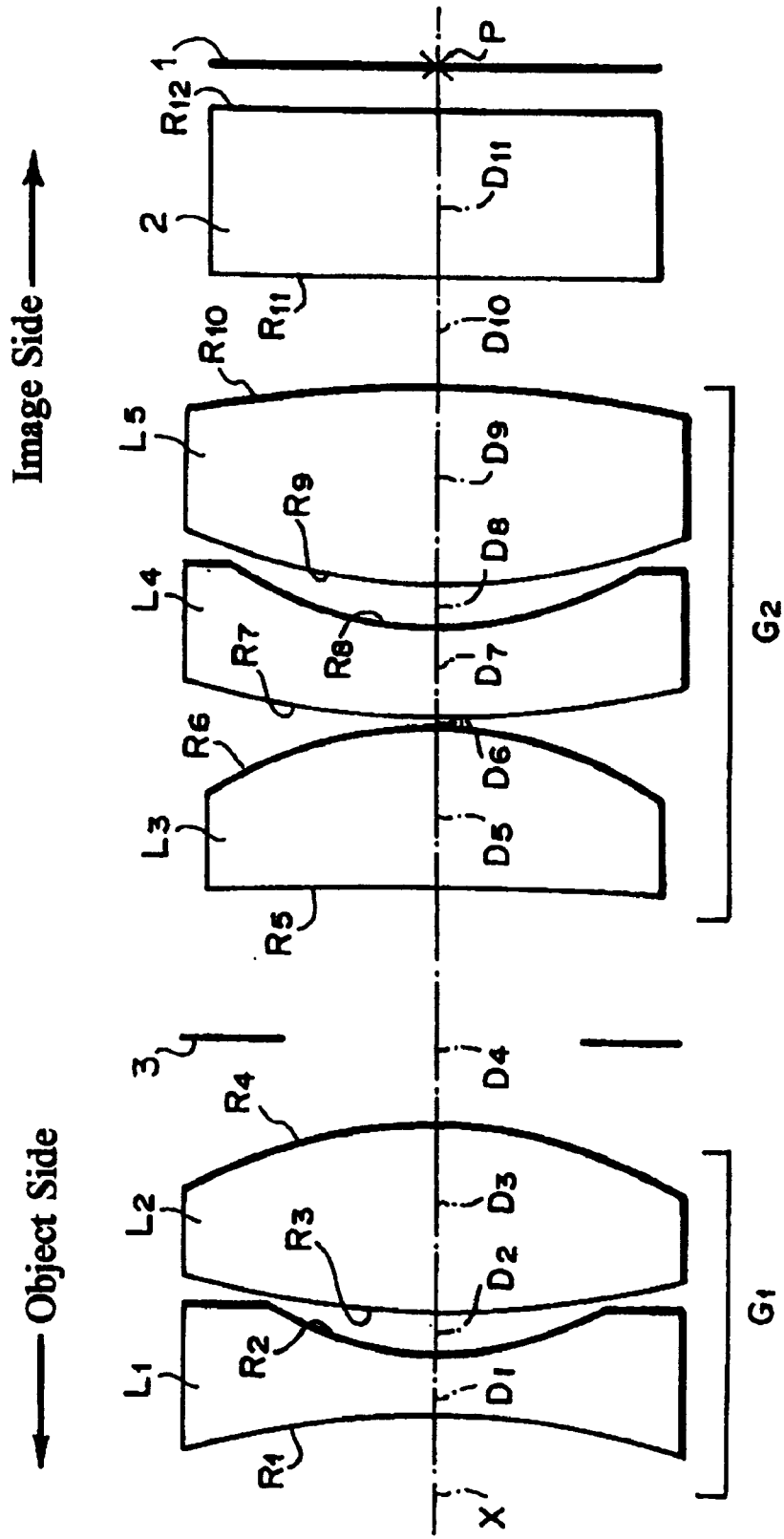
FIG. 1 shows the basic lens element structure of Embodiments 1 and 3–5 of the present invention.
Figure 2:
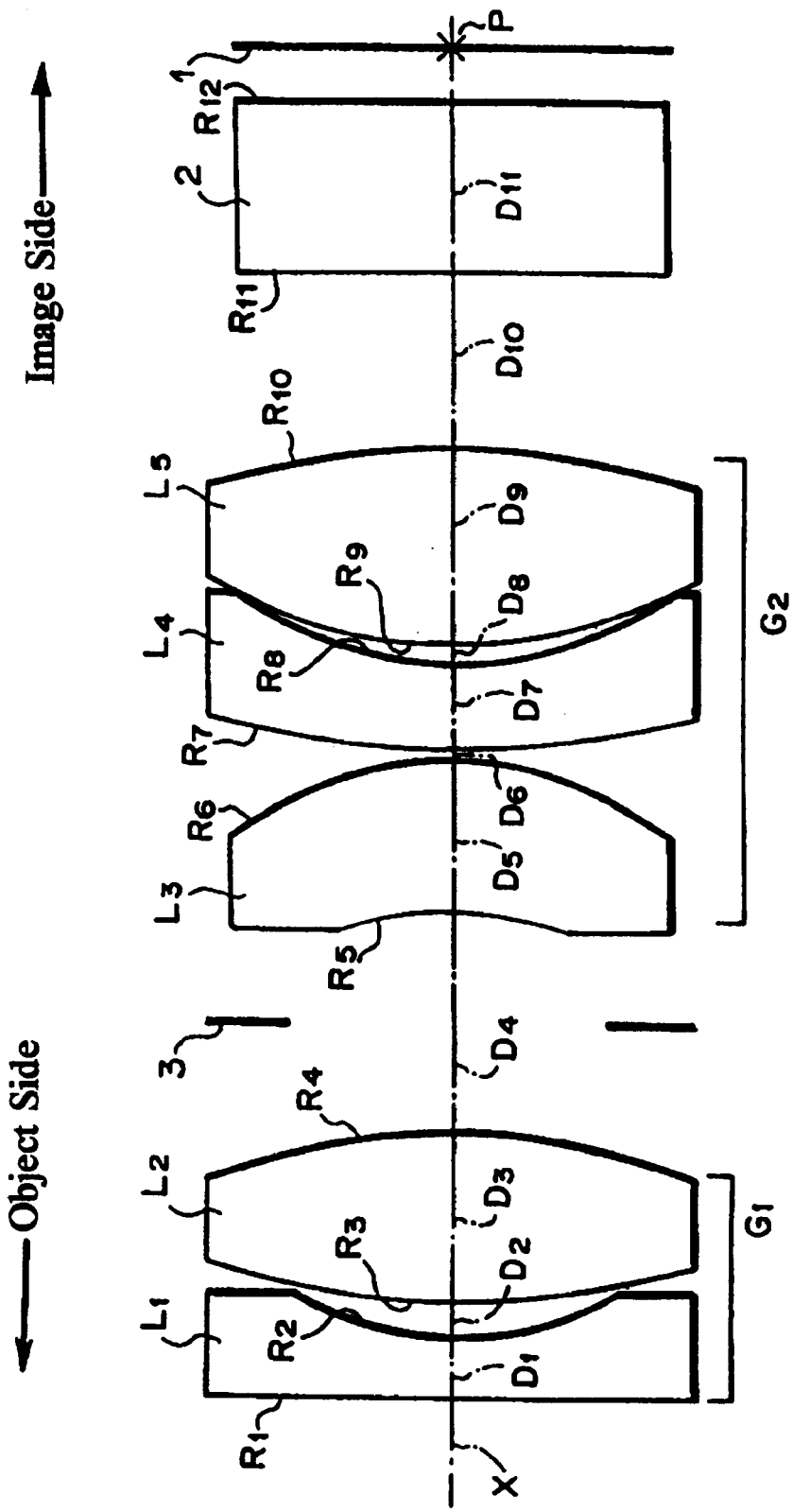
FIG. 2 shows the basic lens element structure of Embodiment 2.
Figure 3:
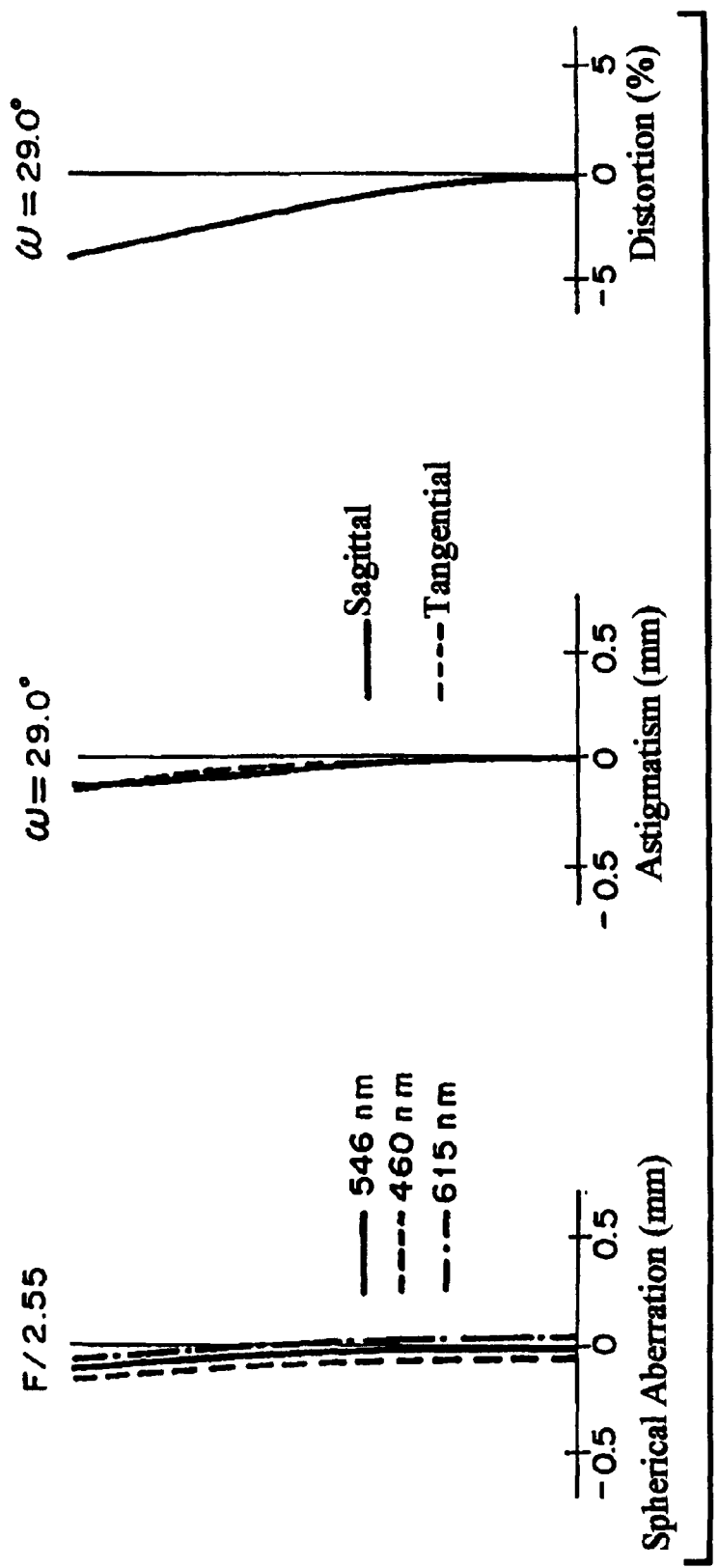
FIG. 3 shows the spherical aberration, astigmatism, and distortion of the lens of Embodiment 1.
Figure 4:
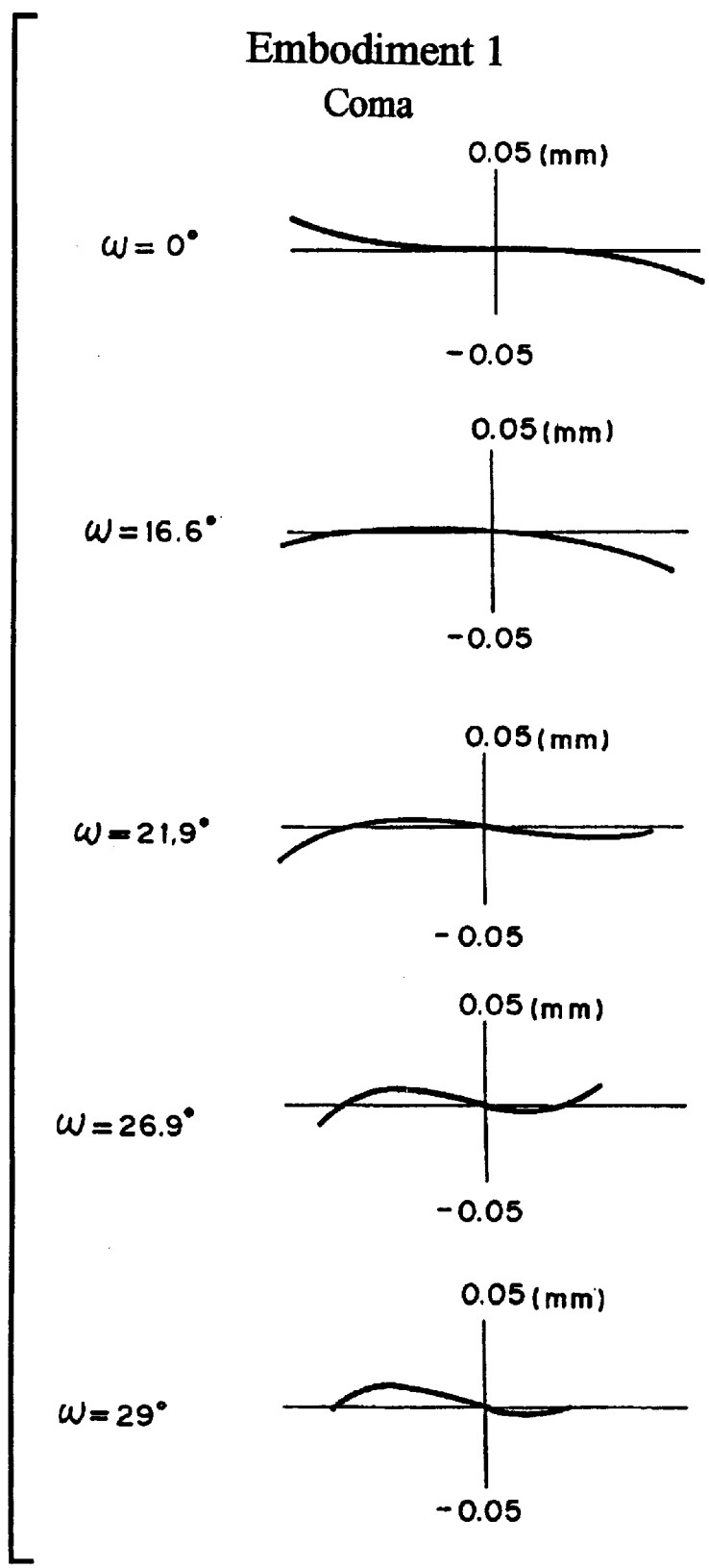
FIG. 4 shows the coma of the lens of Embodiment 1.
Figure 5:
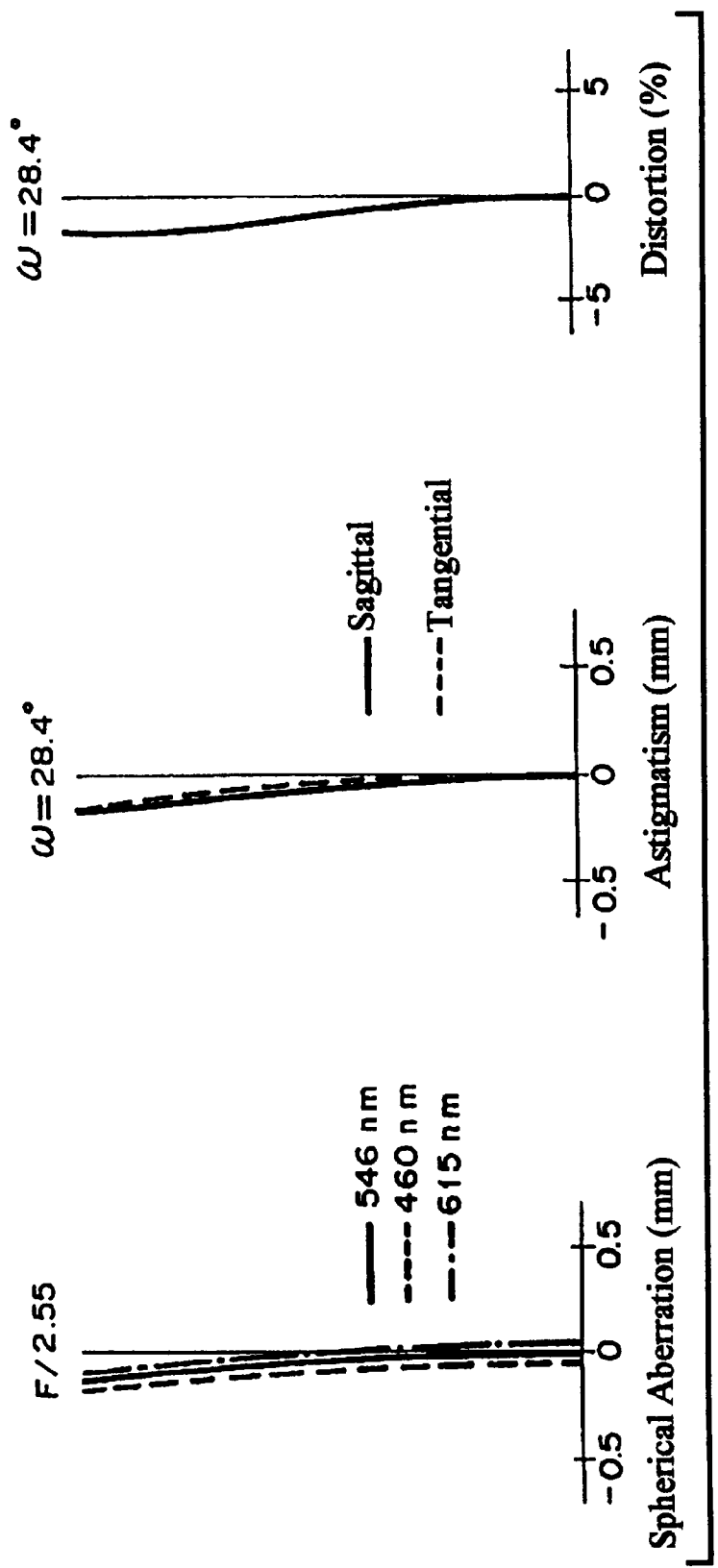
FIG. 5 shows the spherical aberration, astigmatism, and distortion of the lens of Embodiment 2.
Figure 6:
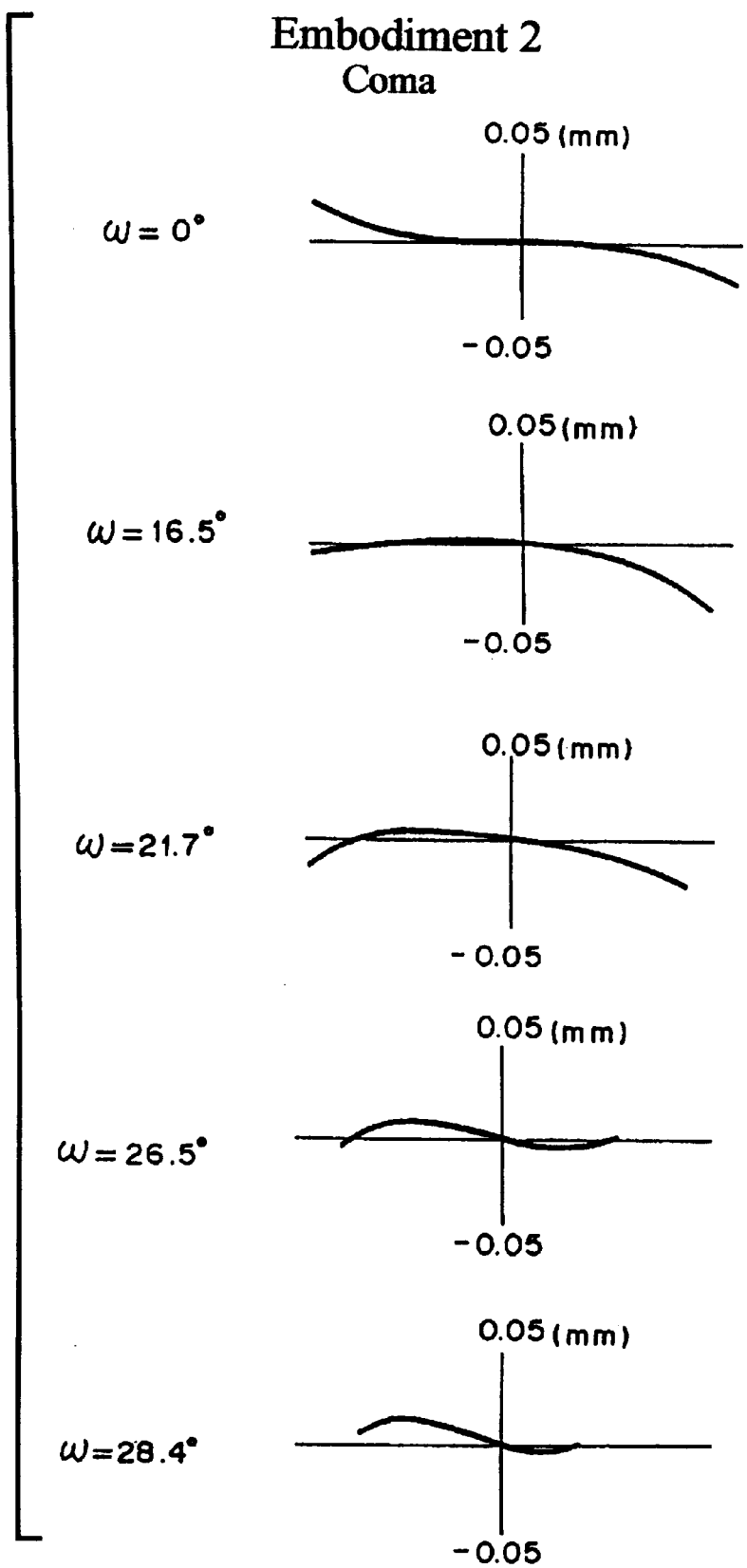
FIG. 6 shows the coma of the lens of Embodiment 2.
Figure 7:
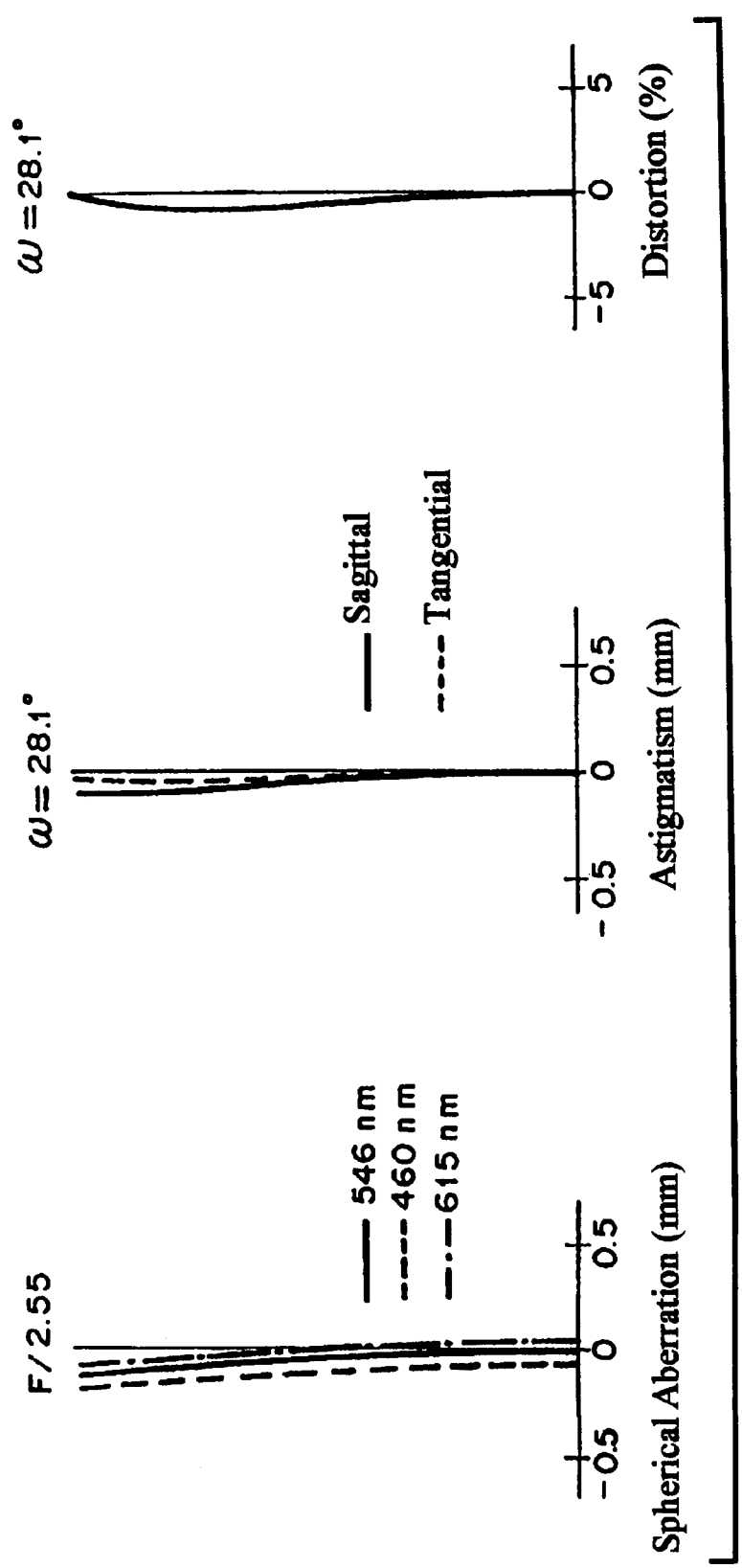
FIG. 7 shows the spherical aberration, astigmatism, and distortion of the lens of Embodiment 3.
Figure 8:
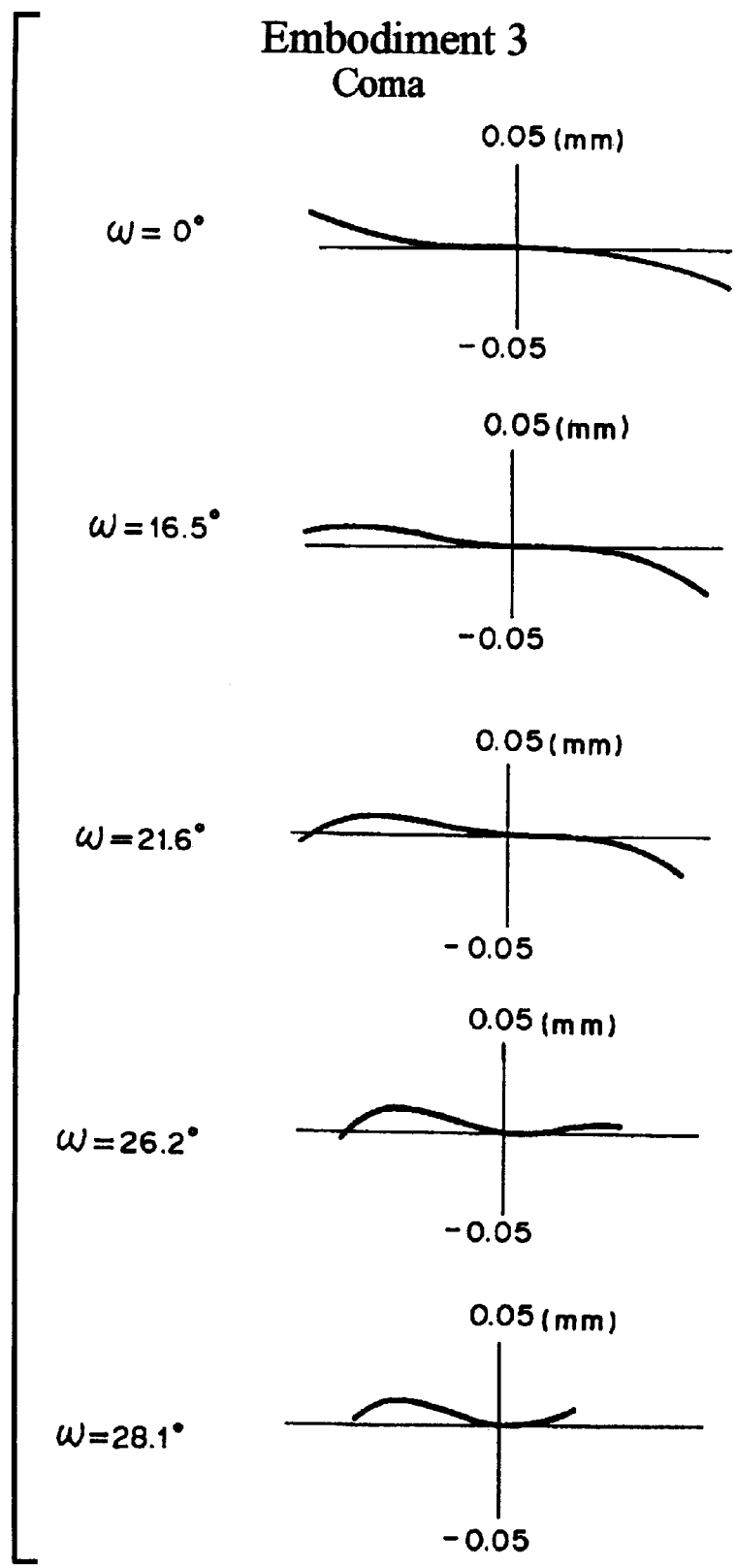
FIG. 8 shows the coma of the lens of Embodiment 3.
Figure 9:
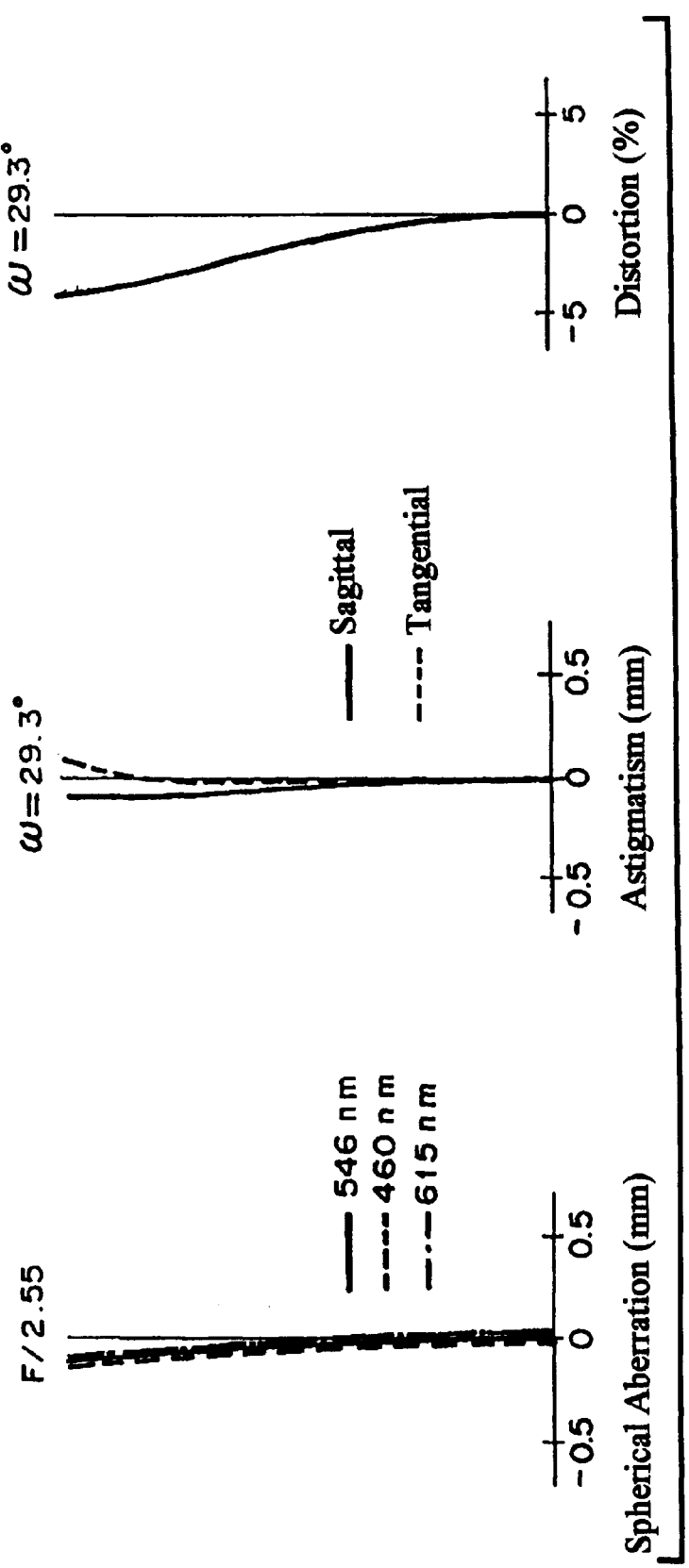
FIG. 9 shows the spherical aberration, astigmatism, and distortion of the lens of Embodiment 4.
Figure 10:
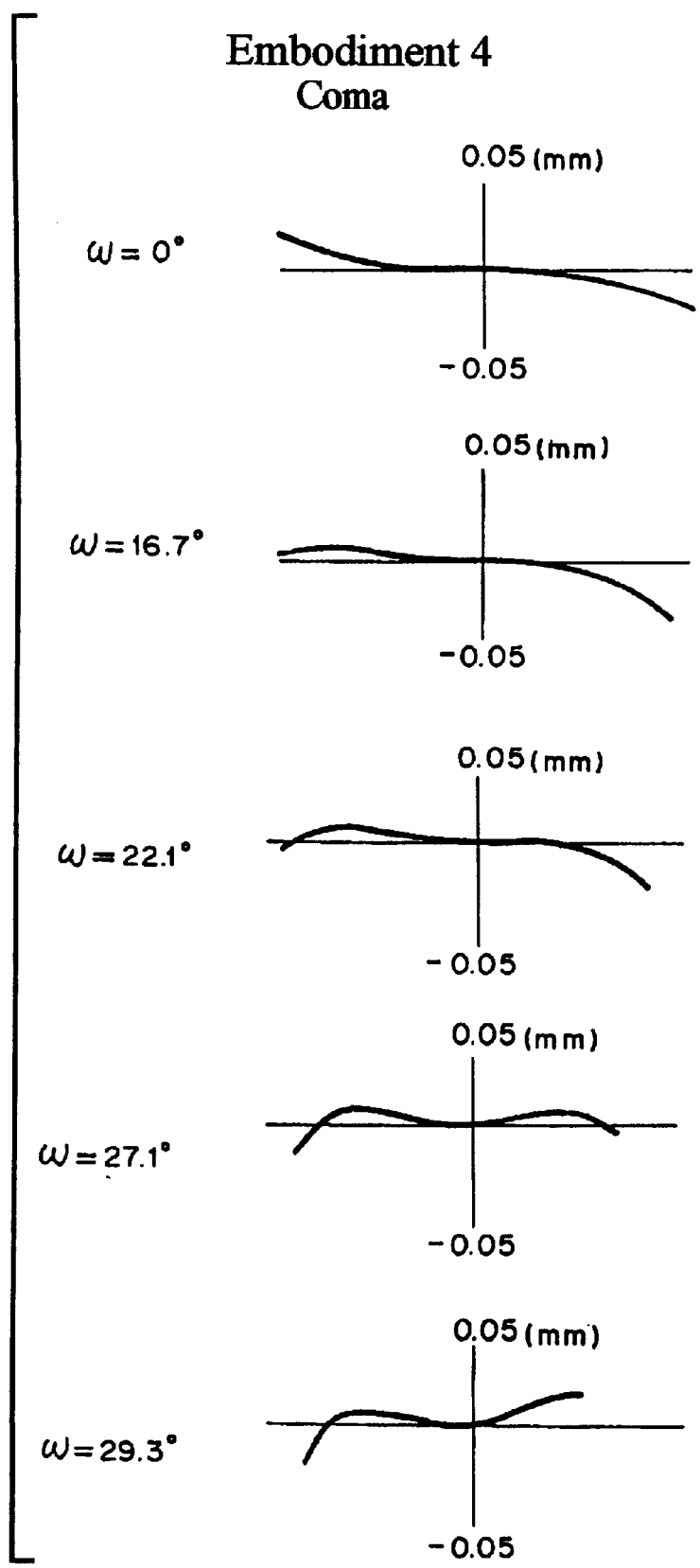
FIG. 10 shows the coma of the lens of Embodiment 4.
Figure 11:
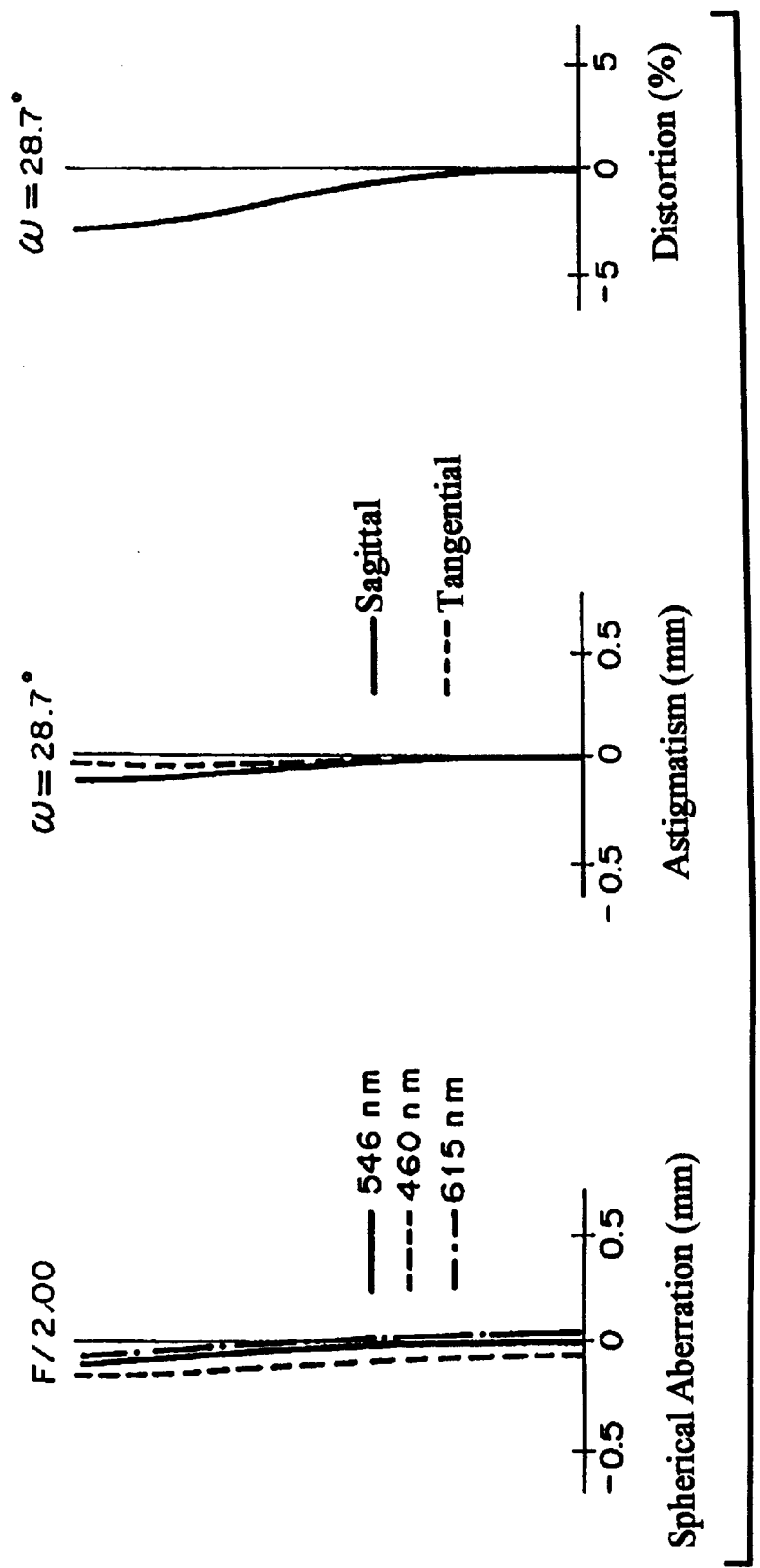
FIG. 11 shows the spherical aberration, astigmatism, and distortion of the lens of Embodiment 5.
Figure 12:
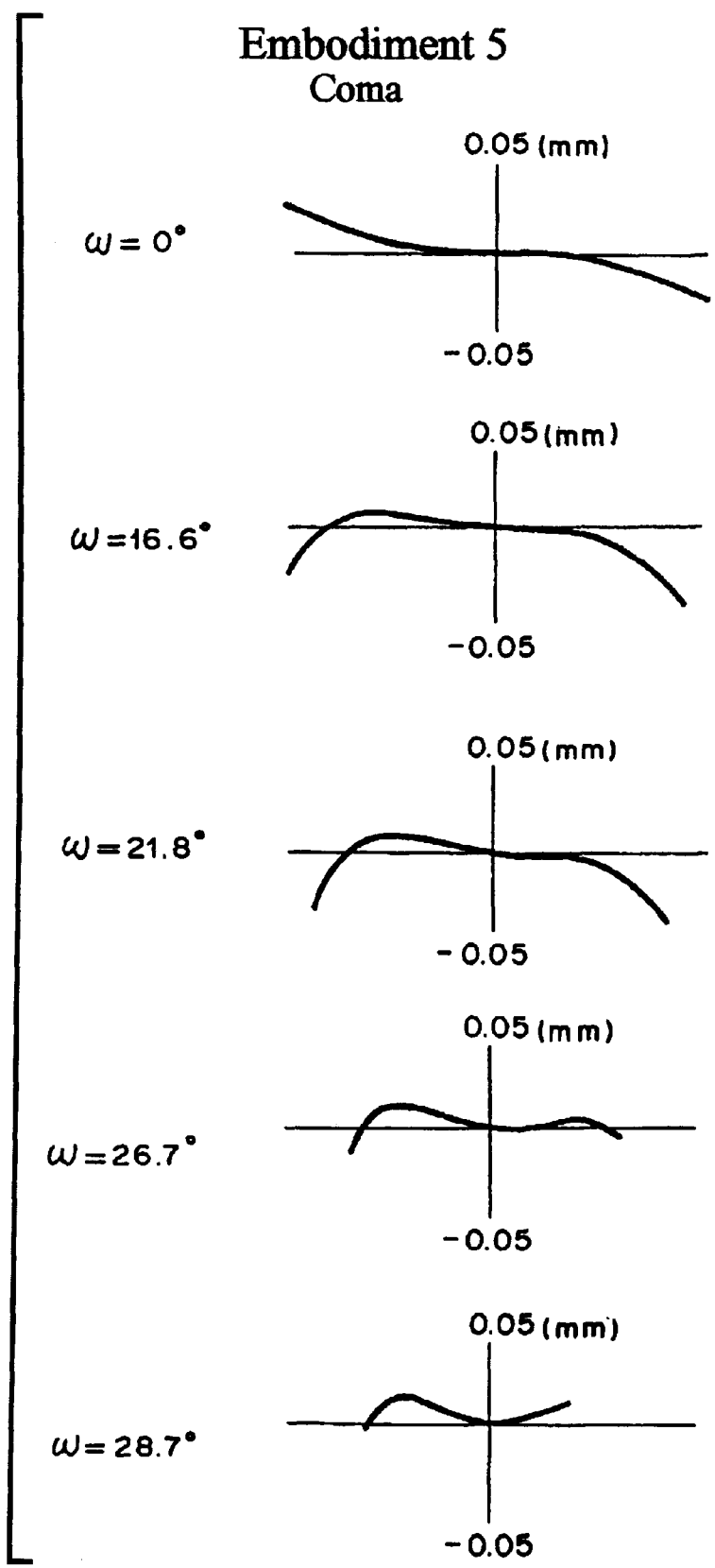
FIG. 12 shows the coma of the lens of Embodiment 5.

Five specific embodiments of the invention will now be described in detail, with reference to the drawings. FIG. 1 illustrates the basic lens element structure of Embodiments 1 and 3–5, and FIG. 2 illustrates the basic lens element structure of Embodiment 2.

Embodiment 1

As illustrated in FIG. 1, the imaging lens of Embodiment 1 comprises, in order from the object side: a front lens group $G_1$ having a first lens element $L_1$ that is biconcave with surfaces of different radii of curvature on its opposite sides, with the surface of stronger curvature on the image side, and a second lens element $L_2$ that is biconvex with surfaces of different radii of curvature on its opposite sides, with the surface of stronger curvature on the image side; and a rear lens group $G_2$ including a third lens element $L_3$ composed of a positive meniscus lens with its convex surface on the image side, a fourth lens element $L_4$ composed of a negative meniscus lens with its concave surface on the image side, and a fifth lens element $L_5$ composed of a biconvex lens with a surface of stronger curvature on the object side; and with the further arrangement of a diaphragm 3 on the image side of the front lens group $G_1$. Additionally there is a filter 2, such as a low pass filter, on the image side of the rear lens group $G_2$. A luminous flux which enters from the object side along the optical axis X is imaged at an imaging position P of a light receiving surface 1 of a solid-state image sensor.

Moreover, since the imaging lens of the invention adjusts only the position of the rear lens group $G_2$ during focusing, a low-cost shutter mechanism having a fixed axial position may be used. Also, the overall imaging lens length does not become excessive even if there is focusing at a near object.

Table 1 lists the surface # in order from the object side, the radius of curvature R in mm of each lens element surface, the on-axis surface spacing D in mm, the index of refraction $N_e$ at the e-line, and the Abbe constant ν for each lens element of Embodiment 1. In addition, the bottom section of Table 1 lists the paraxial values of the focal length f, the back focus Bf (from surface 11), the f-number $F_{NO}$, the half-image angle ω, and value of $f_3/f$ of the imaging lens, where $f_3$ is the focal distance of the third lens element $L_3$, and f is the focal distance of the imaging lens.

TABLE 1

| # | R | D | $N_e$ | ν |
|---|---|---|---|---|
| 1 | −87.415 | 0.7 | 1.62286 | 60.1 |
| 2 | 3.500 | 0.5 | | |
| 3 | 9.973 | 2.0 | 1.83962 | 42.8 |
| 4 | −6.987 | 1.3 | | |
| 5 | (Diaphragm) | 1.3 | | |
| 6 | −4.519 | 1.8 | 1.83962 | 42.8 |
| 7 | −4.085 | 0.1 | | |
| 8 | 11.295 | 1.0 | 1.85504 | 23.6 |
| 9 | 4.271 | 0.2 | | |
| 10 | 5.419 | 2.3 | 1.77621 | 49.4 |
| 11 | −8.344 | 2.0 | | |
| 12 | ∞ | 1.9 | 1.51825 | 63.8 |
| 13 | ∞ | | | |
| f = 4.60 | Bf = 4.30 | $F_{NO}$ = 2.55 | ω = 29.0° | $f_3/f$ = 3.81 |

Thus, since the value of $f_3/f$ is 3.81, Embodiment 1 satisfies Condition (1).

Embodiment 2

The imaging lens of Embodiment 2 has the same basic lens element structure as the imaging lens of Embodiment 1, except that the surface of the first lens element $L_1$ on the object side is flat.

Table 2 lists the surface # in order from the object side, the radius of curvature R in mm of each lens element surface, the on-axis surface spacing D in mm, the index of refraction $N_e$ at the e-line, and the Abbe constant ν for each lens element of Embodiment 2. In addition, the bottom section of Table 2 lists the paraxial values of the focal length f, the back focus Bf (from surface 11), the f-number $F_{NO}$, the half-image angle ω, and value of $f_3/f$ of the imaging lens, where $f_3$ is the focal distance of the third lens element $L_3$, and f is the focal distance of the imaging lens.

TABLE 2

| # | R | D | $N_e$ | ν |
|---|---|---|---|---|
| 1 | ∞ | 0.7 | 1.62286 | 60.1 |
| 2 | 3.500 | 0.4 | | |
| 3 | 8.853 | 2.0 | 1.83962 | 42.8 |
| 4 | −7.229 | 1.2 | | |
| 5 | (Diaphragm) | 1.3 | | |
| 6 | −4.444 | 1.8 | 1.83962 | 42.8 |
| 7 | −3.846 | 0.1 | | |
| 8 | 10.985 | 1.0 | 1.85504 | 23.6 |
| 9 | 4.216 | 0.2 | | |
| 10 | 5.494 | 2.3 | 1.77621 | 49.4 |
| 11 | −8.521 | 2.0 | | |
| 12 | ∞ | 1.9 | 1.51825 | 63.S |
| 13 | ∞ | | | |
| f = 4.60 | Bf = 3.85 | $F_{NO}$ = 2.55 | ω = 28.4° | $f_3/f$ = 3.12 |

Thus, since the value of $f_3/f$ is 3.12, Embodiment 2 satisfies Condition (1).

Embodiment 3

The imaging lens of Embodiment 3 has the same basic lens element structure as the imaging lens of Embodiment 1.

Table 3 lists the surface # in order from the object side, the radius of curvature R in mm of each lens element surface, the on-axis surface spacing D in mm, the index of refraction $N_e$ at the e-line, and the Abbe constant ν for each lens element of Embodiment 3. In addition, the bottom section of Table 3 lists the paraxial values of the focal length f, the back focus Bf (from surface 11), the f-number $F_{NO}$, the half-image angle ω, and value of $f_3/f$ of the imaging lens, where $f_3$ is the focal distance of the third lens element $L_3$, and f is the focal distance of the imaging lens.

TABLE 3

| # | R | D | $N_e$ | ν |
|---|---|---|---|---|
| 1 | −31.207 | 0.7 | 1.71615 | 53.7 |
| 2 | 3.500 | 0.4 | | |
| 3 | 12.000 | 2.1 | 1.83962 | 42.8 |
| 4 | −5.538 | 1.2 | | |
| 5 | (Diaphragm) | 1.7 | | |
| 6 | −30.274 | 1.8 | 1.83962 | 42.8 |
| 7 | −5.107 | 0.1 | | |
| 8 | 7.501 | 1.0 | 1.85504 | 23.6 |
| 9 | 3.500 | 0.3 | | |
| 10 | 7.902 | 2.3 | 1.77621 | 49.4 |
| 11 | −16.162 | 1.5 | | |
| 12 | ∞ | 1.9 | 1.51825 | 63.8 |
| 13 | ∞ | | | |
| f = 4.58 | Bf = 3.14 | $F_{NO}$ = 2.55 | ω = 28.1° | $f_3/f$ = 1.55 |

Thus, since the value of $f_3/f$ is 1.55, Embodiment 3 satisfies Condition (1).

Embodiment 4

The imaging lens of Embodiment 4 has the same basic lens element structure as the imaging lens of Embodiment 1.

Table 4 lists the surface # in order from the object side, the radius of curvature R in mm of each lens element surface, the on-axis surface spacing D in mm, the index of refraction $N_e$ at the e-line, and the Abbe constant ν for each lens element of Embodiment 4. In addition, the bottom section of Table 4 lists the paraxial values of the focal length f, the back focus Bf (from surface 11), the f-number $F_{NO}$, the half-image angle ω, and value of $f_3/f$ of the imaging lens, where $f_3$ is the focal distance of the third lens element $L_3$, and f is the focal distance of the imaging lens.

TABLE 4

| # | R | D | $N_e$ | ν |
|---|---|---|---|---|
| 1 | −9.445 | 0.7 | 1.57047 | 42.5 |
| 2 | 3.500 | 0.5 | | |
| 3 | 11.136 | 2.1 | 1.83962 | 42.8 |
| 4 | −5.375 | 1.0 | | |
| 5 | (Diaphragm) | 1.7 | | |
| 6 | −50.000 | 1.8 | 1.59142 | 61.0 |
| 7 | −4.500 | 0.1 | | |
| 8 | 11.039 | 1.0 | 1.85504 | 23.6 |
| 9 | 3.942 | 0.5 | | |
| 10 | 7.038 | 2.3 | 1.83962 | 42.8 |
| 11 | −12.920 | 1.7 | | |
| 12 | ∞ | 1.9 | 1.51825 | 63.8 |
| 13 | ∞ | | | |
| f = 4.56 | Bf = 3.00 | $F_{NO}$ = 2.55 | ω = 29.3° | $f_3/f$ = 1.83 |

Thus, since the value of $f_3/f$ is 1.83, Embodiment 4 satisfies Condition (1).

Embodiment 5

The imaging lens of Embodiment 5 has the same basic lens element structure as the imaging lens of Embodiment 1.

Table 5 lists the surface # in order from the object side, the radius of curvature R in mm of each lens element surface, the on-axis surface spacing D in mm, the index of refraction $N_e$ at the e-line, and the Abbe constant ν for each lens element of Embodiment 5. In addition, the bottom section of Table 5 lists the paraxial values of the focal length f, the back focus Bf (from surface 11), the f-number $F_{NO}$, the half-image angle ω, and value of $f_3/f$ of the imaging lens, where $f_3$ is the focal distance of the third lens element $L_3$, and f is the focal distance of the imaging lens.

TABLE 5

| # | R | D | $N_e$ | ν |
|---|---|---|---|---|
| 1 | −13.267 | 0.7 | 1.59142 | 61.0 |
| 2 | 3.500 | 0.4 | | |
| 3 | 9.330 | 2.1 | 1.83962 | 42.8 |
| 4 | −5.804 | 1.1 | | |
| 5 | (Diaphragm) | 1.7 | | |
| 6 | −13.126 | 1.8 | 1.80831 | 46.3 |
| 7 | −4.959 | 0.1 | | |
| 8 | 9.464 | 1.0 | 1.85504 | 23.6 |
| 9 | 4.042 | 0.5 | | |
| 10 | 7.197 | 2.3 | 1.83962 | 42.8 |
| 11 | −13.464 | 1.7 | | |
| 12 | ∞ | 1.9 | 1.51825 | 63.8 |
| 13 | ∞ | | | |
| f = 4.60 | Bf = 3.00 | $F_{NO}$ = 2.00 | ω = 28.7° | $f_3/f$ = 1.95 |

Thus, since the value of $f_3/f$ is 1.95, Embodiment 5 satisfies Condition (1).

The spherical aberration, astigmatism, and distortion are shown for Embodiments 1–5, respectively, in FIGS. 3, 5, 7, 9 and 11. The coma is shown for Embodiments 1–5, respectively, in FIGS. 4, 6, 8, 10 and 12. In each aberration figure, ω indicates the half-image angle. As is clearly shown in FIGS. 3–12, each aberration, and particularly distortion, is favorably corrected to a small value in the above Embodiments. In addition, between the imaging lens and the light receiving surface of the solid-state image sensor, an infrared shielding filter or a cover glass may be added along with the low pass filter 2, or inserted in lieu of the low pass filter 2.

The invention being thus described, it will be obvious that the same may be varied in many ways. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. An imaging lens comprising, in order from the object side:

a front lens group including a plano-concave lens element or a biconcave lens element, and a biconvex lens;

a diaphragm; and a rear lens group having positive refractive power; wherein focusing is carried out by shifting only the rear group relative to an image-formation surface of said imaging lens.

2. The imaging lens according to claim 1 wherein the rear lens group comprises, in order from the object side, a positive meniscus lens element with its convex surface on the image side, a negative meniscus lens element with its concave surface on the image side, and a biconvex lens element.

3. The imaging lens according to claim 2 wherein the following condition is satisfied:

$$1.4 < f_3/f < 4.2$$

where $f_3$ is the focal length of the positive meniscus lens element of the rear lens group, and f is the focal length of the imaging lens.

4. The imaging lens according to claim 1, said lens having the following construction:

TABLE 6

| # | R | D | $N_e$ | ν |
|---|---|---|---|---|
| 1 | −87.415 | 0.7 | 1.62286 | 60.1 |
| 2 | 3.500 | 0.5 | | |
| 3 | 9.973 | 2.0 | 1.83962 | 42.8 |
| 4 | −6.987 | 1.3 | | |
| 5 | (Diaphragm) | 1.3 | | |
| 6 | −4.519 | 1.8 | 1.83962 | 42.8 |
| 7 | −4.085 | 0.1 | | |
| 8 | 11.295 | 1.0 | 1.85504 | 23.6 |
| 9 | 4.271 | 0.2 | | |
| 10 | 5.419 | 2.3 | 1.77621 | 49.4 |
| 11 | −8.344 | 2.0 | | | where # is the surface number in order from the object side, R is the radius of curvature in mm of each lens surface, D is the on-axis surface spacing in mm, $N_e$ is the index of refraction for the e-line and ν is the Abbe constant for each lens element.

5. The imaging lens according to claim 1, said lens having the following construction:

| # | R | D | $N_e$ | ν |
|---|---|---|---|---|
| 1 | ∞ | 0.7 | 1.62286 | 60.1 |
| 2 | 3.500 | 0.4 | | |
| 3 | 8.853 | 2.0 | 1.83962 | 42.8 |
| 4 | −7.229 | 1.2 | | |
| 5 | (Diaphragm) | 1.3 | | |
| 6 | −4.444 | 1.8 | 1.83962 | 42.8 |
| 7 | −3.846 | 0.1 | | |
| 8 | 10.985 | 1.0 | 1.85504 | 23.6 |
| 9 | 4.216 | 0.2 | | |
| 10 | 5.494 | 2.3 | 1.77621 | 49.4 |
| 11 | −8.521 | 2.0 | | | where # is the surface number in order from the object side, R is the radius of curvature in mm of each lens surface, D is the on-axis surface spacing in mm, $N_e$ is the index of refraction for the e-line and ν is the Abbe constant for each lens element.

6. The imaging lens according to claim 1, said lens having the following construction:

| # | R | D | $N_e$ | ν |
|---|---|---|---|---|
| 1 | −31.207 | 0.7 | 1.71615 | 53.7 |
| 2 | 3.500 | 0.4 | | |
| 3 | 12.000 | 2.1 | 1.83962 | 42.8 |
| 4 | −5.538 | 1.2 | | |
| 5 | (Diaphragm) | 1.7 | | |
| 6 | −30.274 | 1.8 | 1.83962 | 42.8 |
| 7 | −5.107 | 0.1 | | |
| 8 | 7.501 | 1.0 | 1.85504 | 23.6 |
| 9 | 3.500 | 0.3 | | |
| 10 | 7.902 | 2.3 | 1.77621 | 49.4 |
| 11 | −16.162 | 1.5 | | | where # is the surface number in order from the object side, R is the radius of curvature in mm of each lens surface, D is the on-axis surface spacing in mm, $N_e$ is the index of refraction for the e-line and ν is the Abbe constant for each lens element.

7. The imaging lens according to claim 1, said lens having the following construction:

TABLE 4

| # | R | D | $N_e$ | ν |
|---|---|---|---|---|
| 1 | −9.445 | 0.7 | 1.57047 | 42.5 |
| 2 | 3.500 | 0.5 | | |
| 3 | 11.136 | 2.1 | 1.83962 | 42.8 |
| 4 | −5.375 | 1.0 | | |
| 5 | (Diaphragm) | 1.7 | | |
| 6 | −50.000 | 1.8 | 1.59142 | 61.0 |
| 7 | −4.500 | 0.1 | | |
| 8 | 11.039 | 1.0 | 1.85504 | 23.6 |
| 9 | 3.942 | 0.5 | | |
| 10 | 7.038 | 2.3 | 1.83962 | 42.8 |
| 11 | −12.920 | 1.7 | | | where # is the surface number in order from the object side, R is the radius of curvature in mm of each lens surface, D is the on-axis surface spacing in mm, $N_e$ is the index of refraction for the e-line and ν is the Abbe constant for each lens element.

8. The imaging lens according to claim 1, said lens having the following construction:

| # | R | D | $N_e$ | ν |
|---|---|---|---|---|
| 1 | −13.267 | 0.7 | 1.59142 | 61.0 |
| 2 | 3.500 | 0.4 | | |
| 3 | 9.330 | 2.1 | 1.83962 | 42.8 |
| 4 | −5.804 | 1.1 | | |
| 5 | (Diaphragm) | 1.7 | | |
| 6 | −13.126 | 1.8 | 1.80831 | 46.3 |
| 7 | −4.959 | 0.1 | | |
| 8 | 9.464 | 1.0 | 1.85504 | 23.6 |
| 9 | 4.042 | 0.5 | | |
| 10 | 7.197 | 2.3 | 1.83962 | 42.8 |
| 11 | −13.464 | 1.7 | | | where # is the surface number in order from the object side, R is the radius of curvature in mm of each lens surface, D is the on-axis surface spacing in mm, $N_e$ is the index of refraction for the e-line and ν is the Abbe constant for each lens element.

\* \* \* \* \*

UNITED STATES PATENT AND TRADEMARK OFFICE
CERTIFICATE OF CORRECTION

PATENT NO : 6,075,658
DATED : June 13, 2000
INVENTOR(S): Akiko NAGAHARA It is certified that error appears in the above-identified patent and that said Letters Patent are hereby corrected as shown below:

At column 1, line 4: "stiff" should be - - still- -

Signed and Sealed this

Third Day of April, 2001

*Attest:*

NICHOLAS P. GODICI

*Attesting Officer*    *Acting Director of the United States Patent and Trademark Office*